United States Patent
Lee

(10) Patent No.: US 9,692,244 B2
(45) Date of Patent: Jun. 27, 2017

(54) CHARGING MEANS AND APPARATUS FOR SECONDARY BATTERY

(71) Applicant: Yung Ju Lee, Taichung (TW)

(72) Inventor: Yung Ju Lee, Taichung (TW)

( * ) Notice: Subject to any disclaimer, the term of this patent is extended or adjusted under 35 U.S.C. 154(b) by 79 days.

(21) Appl. No.: 14/847,548

(22) Filed: Sep. 8, 2015

(65) Prior Publication Data

US 2017/0070072 A1    Mar. 9, 2017

(51) Int. Cl.
*H02J 7/00* (2006.01)

(52) U.S. Cl.
CPC ................... *H02J 7/0068* (2013.01)

(58) Field of Classification Search
CPC ...... H02J 7/0021; H02J 7/0024; H02J 7/0016; H02J 7/007; H02J 2007/0067; H02J 7/0013; H02J 7/0068
See application file for complete search history.

(56) References Cited

U.S. PATENT DOCUMENTS

| | | | | |
|---|---|---|---|---|
| 6,504,344 B1* | 1/2003 | Adams | ............... | G01R 31/3658 320/132 |
| 9,136,716 B2* | 9/2015 | White | ............... | B60L 11/1861 |
| 2004/0189250 A1* | 9/2004 | Nishida | ............... | H02J 7/0024 320/116 |
| 2007/0216355 A1* | 9/2007 | Kim | ............... | H02J 7/0024 320/128 |
| 2007/0247107 A1* | 10/2007 | Wang | ............... | H02J 7/0073 320/107 |
| 2008/0191662 A1* | 8/2008 | Nakanishi | ............... | H02J 7/0016 320/118 |
| 2011/0068746 A1* | 3/2011 | Rocci | ............... | H01M 10/441 320/118 |
| 2011/0074350 A1* | 3/2011 | Kocher | ............... | B60L 11/1816 320/109 |
| 2011/0309795 A1* | 12/2011 | Firehammer | ......... | H02J 7/0014 320/118 |
| 2012/0299549 A1* | 11/2012 | Kim | ............... | H01M 10/0445 320/118 |
| 2013/0044002 A1* | 2/2013 | Schneider | ............ | H01M 10/441 340/636.2 |
| 2013/0127423 A1* | 5/2013 | Liang | ............... | H01M 10/443 320/136 |
| 2013/0175975 A1* | 7/2013 | Shinozaki | ............ | B60L 11/1864 320/106 |
| 2013/0257377 A1* | 10/2013 | Diamond | ............. | G01R 31/362 320/118 |

(Continued)

*Primary Examiner* — Nha Nguyen
(74) *Attorney, Agent, or Firm* — Chun-Ming Shih

(57) ABSTRACT

A charging means and apparatus which can quickly charge the secondary battery, the apparatus includes a plurality of power supply battery packs, each power supply battery pack corresponds to a charge-discharge circuit, and a microcontroller. The microcontroller sequentially and rotationally selects one of the pluralities of power supply battery packs to charge the secondary battery, and the plurality of power supply battery packs will be recharged after the discharging. After the discharging of the last one of the plurality of power supply battery packs is completed, the power supply battery pack which discharges firstly has done the recharging process and ready to discharge a again, and thus making sure at least one power supply battery pack is in fully charged condition, which is ready to discharge anytime.

5 Claims, 5 Drawing Sheets

(56) References Cited

U.S. PATENT DOCUMENTS

| | | | |
|---|---|---|---|
| 2013/0320930 A1* | 12/2013 | Suzuki | H01M 10/482 320/134 |
| 2014/0055097 A1* | 2/2014 | Nagai | H02J 7/007 320/134 |
| 2014/0091751 A1* | 4/2014 | Workman | H02J 7/0013 320/106 |
| 2014/0210265 A1* | 7/2014 | Thorsoe | H02J 7/0011 307/23 |
| 2014/0210483 A1* | 7/2014 | Uchida | G01R 31/3658 324/434 |
| 2015/0008879 A1* | 1/2015 | Schneider | H02J 7/0024 320/110 |
| 2015/0048673 A1* | 2/2015 | Chintala | B60L 1/00 307/9.1 |
| 2016/0105042 A1* | 4/2016 | Taylor | H01M 10/128 320/134 |
| 2016/0149420 A1* | 5/2016 | Sasaki | B60L 11/1859 320/134 |
| 2016/0309617 A1* | 10/2016 | Kimoto | B60L 3/0046 |

\* cited by examiner

CHARGING MEANS AND APPARATUS FOR SECONDARY BATTERY

BACKGROUND

1. Technical Field

The technical field relates to a charging means and apparatus for secondary battery. This means and apparatus can quickly charge the battery, especially the secondary battery.

2. Related Art

Traditionally, the moving carrier such as cars, motorcycles, use internal combustion engine as the power generator. The internal combustion engine needs fossil fuels, such as gasoline, diesel fuel, to be the power source. However, harmful gas, such as carbon dioxide, carbon monoxide, sulfide, etc., can be created by the combustion of the gasoline and diesel fuel in the engine, which not only harmful to human's health and the environment, but also become one of the reasons to cause greenhouse effect.

The motorization of the moving carrier can improve the aforementioned problem. Even though not being able to fully solve the problem, the harmful to the earth and the air pollution can still be improved. In order to motorize the car and the motorcycles, rechargeable secondary battery has become the key factor.

Except car being the main transportation in the world, motorcycle is also one of the important transportation vehicles, especially in Asian country. The cars and motorcycles which use traditional engine can refill the gas within a few minutes, and thus has better fuel range. The cars and motorcycles using secondary battery usually need to charge for 4 to 8 hours, which depends on the design of the vehicle. The secondary battery with relative small capacity, such as the battery (48V/22AH) used in the electric motorcycle, still needs to be charged more than 1 hour in quick charge mode. Therefore, the charging time problem has become a main reason to hinder the popularization of the electric cars and motorcycles.

Traditionally, the aforementioned secondary battery is charged by the AC electricity power outlet where the AC is further converted into DC electricity by a convertor to be used by the secondary battery. This charging method is the reason of long charging time.

BRIEF SUMMARY

In order to solve the long charging time problem of the secondary battery, the preferred embodiment of the present invention provides a charging means and an apparatus for secondary battery, which can shorten the charging time of the secondary battery.

The technique used in this preferred embodiment is as follows:

In one of the preferred embodiment of the present invention, a charging apparatus for a secondary battery includes a plurality of power supply battery packs, a plurality of charge-discharge circuits, and a microcontroller. Wherein, each of the plurality of power supply battery packs has at least a secondary battery and is defined a charging and a discharging sequence, each of the plurality of power supply battery packs discharges in rotation to supply power to the secondary battery; each of the charge-discharge circuits corresponds to one of the plurality of power supply battery packs, each of the plurality of charge-discharge circuits charges a corresponding power supply battery pack by an external power supply, and each of the plurality of charge-discharge circuits controls the corresponding power supply battery pack to discharge; the microcontroller is electrically connected to each charge-discharge circuit to control charging and discharging of each power supply battery pack corresponding to each charge-discharge circuit; wherein the microcontroller sequentially selects one of the power supply battery packs to discharge and be recharged after the discharging; when a last power supply battery unit is recharged after discharging, the power supply battery pack which discharges firstly has been fully recharged to wait for discharging.

According to the charging apparatus for a secondary battery mentioned above, wherein: a quantity of the plurality of power supply battery packs=(charging time of each power supply battery pack÷discharging time of each power supply battery pack)+1, decimals are added or subtracted.

According to the charging apparatus for a secondary battery mentioned above, wherein each of the plurality of charge-discharge circuits includes an analog detection and control circuit, a charging switch, a discharging switch, and a resistor; the analog detection and control circuit detects power level of each of the plurality of power supply battery packs for the microcontroller, the plurality of power supply battery packs discharge through the discharging switch and is recharged through the charging switch.

According to the charging apparatus for a secondary battery mentioned above, the microcontroller is connected to an input-output module of a host computer for being an operation interface.

According to the charging apparatus for a secondary battery mentioned above, wherein an electricity potential of the power supply battery packs are higher than that of the secondary battery.

According to the charging apparatus for a secondary battery mentioned above, the external power supply is commercial electricity power.

According to the charging apparatus for a secondary battery mentioned above, wherein the charging switch and the discharging switch are selected from field-effect transistor, silicon controlled rectifier, and impulse circuit.

In another preferred embodiment of the present invention, a charging means for charging a secondary battery includes: using a plurality of power supply battery packs as a power supplement for charging the secondary battery; each time one of the plurality of power supply battery packs is selected to discharge; the plurality of power supply battery packs discharge in rotation to be transformed into discharged power supply battery; an external power supply charges the discharged power supply battery in sequence; wherein when a last one of the plurality of power supply battery packs is totally discharged, a recharging on the power supply battery pack which is discharged in the first place is completed or nearly completed for waiting to discharge.

According to the charging means for a secondary battery mentioned above, wherein a quantity of the plurality of power supply battery packs=(charging time of each power supply battery pack/discharging time of each power supply battery pack)+1, decimals are added or subtracted.

According to the charging means for a secondary battery mentioned above, wherein an electricity potential of the power supply battery packs are higher than that of the secondary battery.

The preferred embodiment of the present invention uses a plurality of power supply packs as a power source of the secondary battery and each time selects one power supply battery pack to supply electricity. Each power supply battery pack rotationally and sequentially discharges and will be recharge immediately after the discharging. After the discharging of the last power supply battery pack is completed, the first discharging power supply battery pack has been fully recharged, therefore there is always a fully charged power supply battery pack ready to discharge as needed. The charging time for battery to battery charging is significantly shorter than that for the main electricity supply to battery, therefore, the charging time of the secondary battery can be reduced accordingly.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
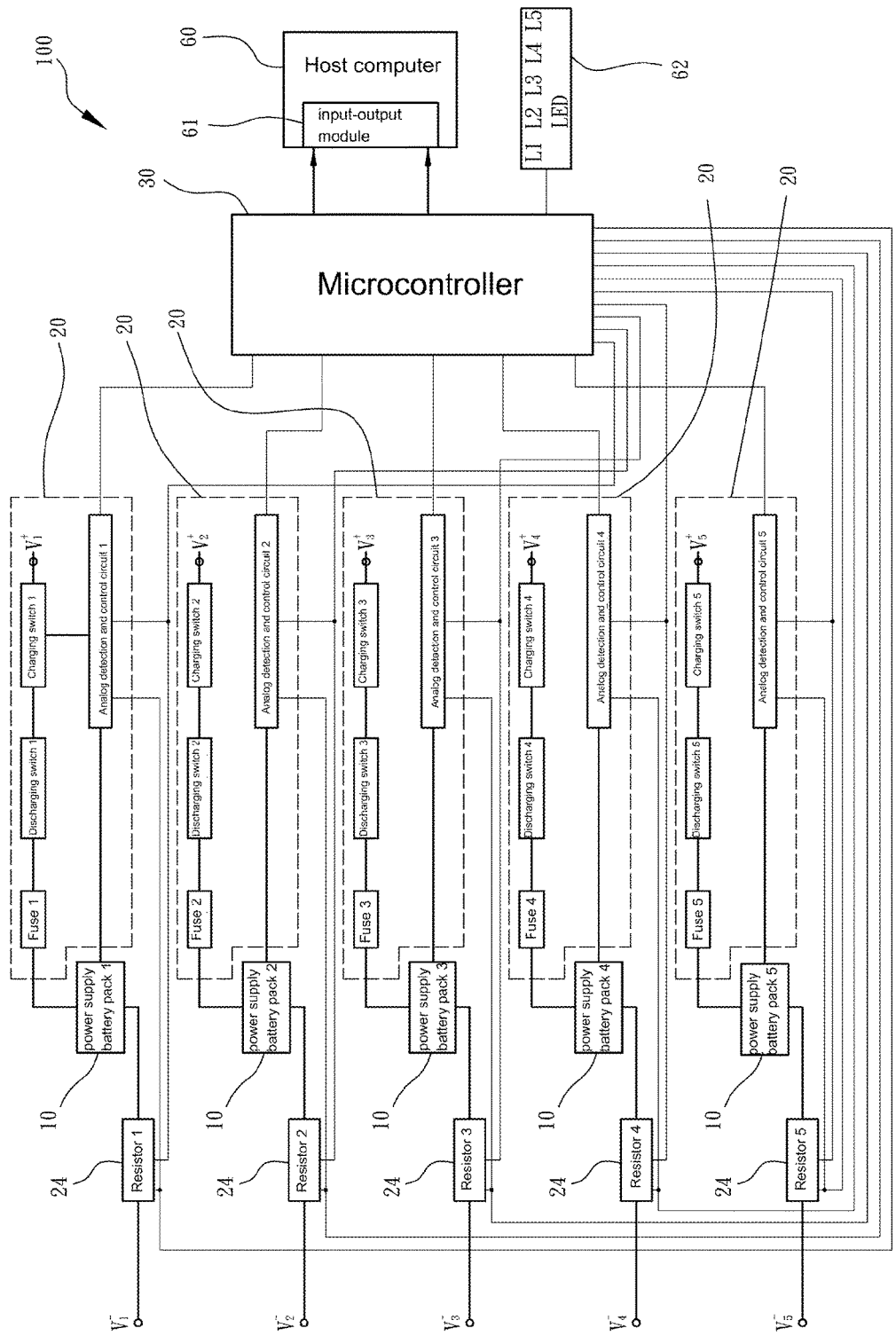
FIG. 1 is a preferred embodiment of the functional illustration diagram of the charging apparatus of the secondary battery according to the present invention.
Figure 2:
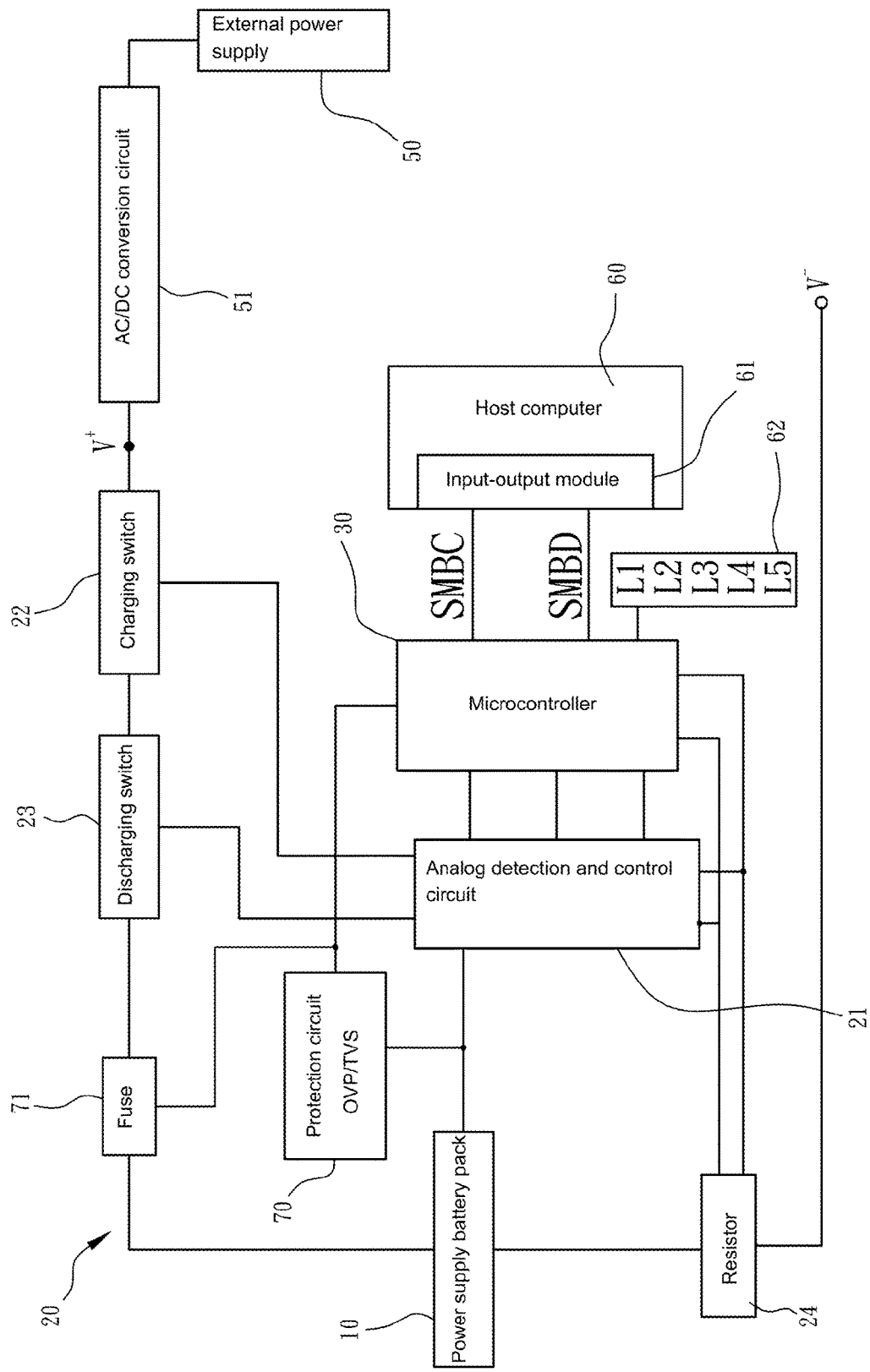
FIG. 2 is a functional illustration diagram of a single power supply battery pack and the charging circuit of FIG. 1.
Figure 3:
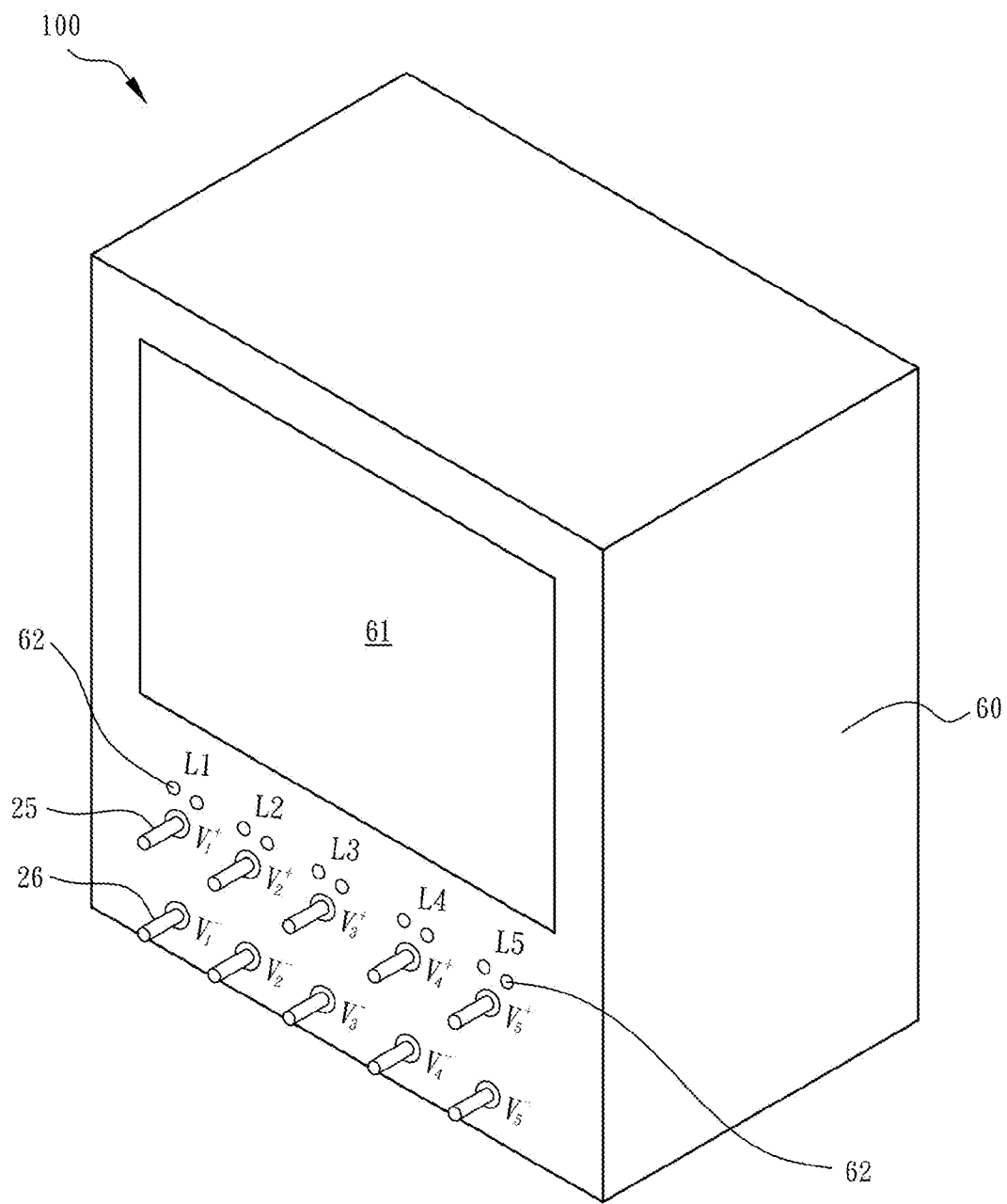
FIG. 3 is a preferred embodiment of schematic view of the charging apparatus of the secondary battery according to the present invention.

Please refer to FIGS. 1-3, the secondary battery charging apparatus 100 according to the present invention includes a plurality of power supply battery packs 10, a plurality of charge-discharge circuits 20, and a microcontroller 30. One skilled in the art will know that the present invention is not limited to the embodiment shown in the FIG. 1.

Each power supply battery pack 10 obtains electricity from an external power supply, such as the commercial main electricity supply. The power supply battery packs 10 can provide electricity to the secondary battery 40, and the electricity potential of the power supply battery packs 10 are higher than that of the secondary battery 40. In the preferred embodiment of the present invention, 48V/22AH secondary battery 40 is used as example, and the power supply battery packs 10 uses 60V/22AH secondary battery as an example. The power supply battery backs 10 in the present invention also use secondary battery, so as to easily obtain electricity from the commercial main power and provide the electricity to the secondary battery 40. Besides, each power supply battery pack 10 is defined a charging and a discharging sequence, and rotationally provides electricity to the secondary battery 40.

In the preferred embodiment of the present invention, the quantities of the power supply battery pack 10=(charging time of each power supply battery pack÷discharging time of each power supply battery pack)+1, decimals are added or subtracted. In the preferred embodiment of the present invention, the power supply battery packs 10 preferably are 60V/22AH rechargeable secondary battery. If this kind of battery is slowly charged by the commercial main power, a couple hours is needed to fully charge the battery (ex. 7 hours), while quick charging only takes about 1 hour. Besides, in the preferred embodiment of the present invention, battery to battery charging is used, which means the power supply battery packs 10 discharge to provide electricity to charge the secondary battery 40, which takes only about 15 minutes. The standard of the charging rate is set as 70% of fully charged capacity. Therefore, according to the equation mentioned above and take quick charge as example, the quantity of the power supply battery packs 10 equals to (60 minutes÷15 minutes)+1=5. The FIG. 1 shows using the quick charging mode to charge the power supply battery packs 10. Besides, if using slow charging mode, the quantity of the power supply battery packs 10 equals to (7×60÷15)+1=29 (FIGS. not shown).

In the preferred embodiment of the present invention, each charge-discharge circuit 20 corresponds to each power supply battery pack 10, and each charge-discharge circuit 20 charges the corresponding power supply battery pack 10 from the external power supply 50, such as commercial main power, and each charge-discharge circuit 20 controls the discharging of the corresponding power supply battery pack 10, so as to provide electricity to the secondary battery 40.

In the preferred embodiment of the present invention, each charge-discharge circuit 20 includes an analog detection and control circuit 21, a charging switch 22, a discharging switch 23, a pair of external terminals 25/26, and a resistor 24. The analog detection and control circuit 21 detects the power level of the power supply battery packs 10 and provides the information to the microcontroller 30. The power supply battery packs 10 discharge through a discharging switch 23, and the power supply battery packs 10 are then recharged through the charging switch 22. The external terminals 25/26 are provided outside of the host computer 60 for connecting the secondary battery 40.

The aforementioned charging switch 22 and the discharging switch 23 preferably are field-effect transistor (FET), silicon controlled rectifier (SCR), or impulse circuit. The microcontroller 30 can be linked to an input-output module 61 of the host computer 60 through System Management Bus (SMbus) for inputting information and displaying the graphics or words information. The analog detection and control circuit 21 can be used by the host computer 60 to monitor the conditions of all the power supply battery packs 10, and the power supply battery packs 10 can discharge or charge through the discharging switch 23 and the charging switch 22, respectively. The analog detection and control circuit 21 updates the conditions of the power supply battery packs 10 to the host computer 60. Therefore, the microcontroller 30 can be used to monitor all the charging and discharging of the power supply battery packs 10. Besides, the microcontroller 30 has an internal data flash memory which can be programmed to include information about capacity, internal reference voltage, or any other similar programmable data.

In the preferred embodiment of the present invention, a protection circuit is provided between each power supply battery pack 10 and the microcontroller 30. The protection circuit 70 is typically like overvoltage protection circuit (OVP) or transient voltage suppressor circuit (TVS). The analog to digital converter (ADC) of the microcontroller 30 can be used to measure the amount of charging and discharging by monitoring the terminals of the resistor 24, and can also be used to generate control signal to initial an appropriate safety protection response according to the battery condition of the power supply battery pack 10. When the microcontroller 30 detects abnormal or unsafe condition, the non-reusable fuse 71 will be triggered so as to stop using the power supply battery pack 10.

Except controlling of the charging and discharging, the analog detection and control circuit 21 and the microcontroller 30 also provides safety protection, such as voltage protection, short circuit protection, overcurrent protection, and temperature protection of the power supply battery pack 10, as well as monitoring voltage, current, and the temperature. All of this operation and display can be done on the input-output module 61 of the host computer 60.

Besides, the microcontroller 30 is also linked to a set of LED indicator light 62 which has 5 sets of indicator light L1, L2, L3, L4, and L5. Each set of the indicator light uses multiple-color LED lights to show the charging and discharging status of each power supply battery pack 10.

Figure 4:
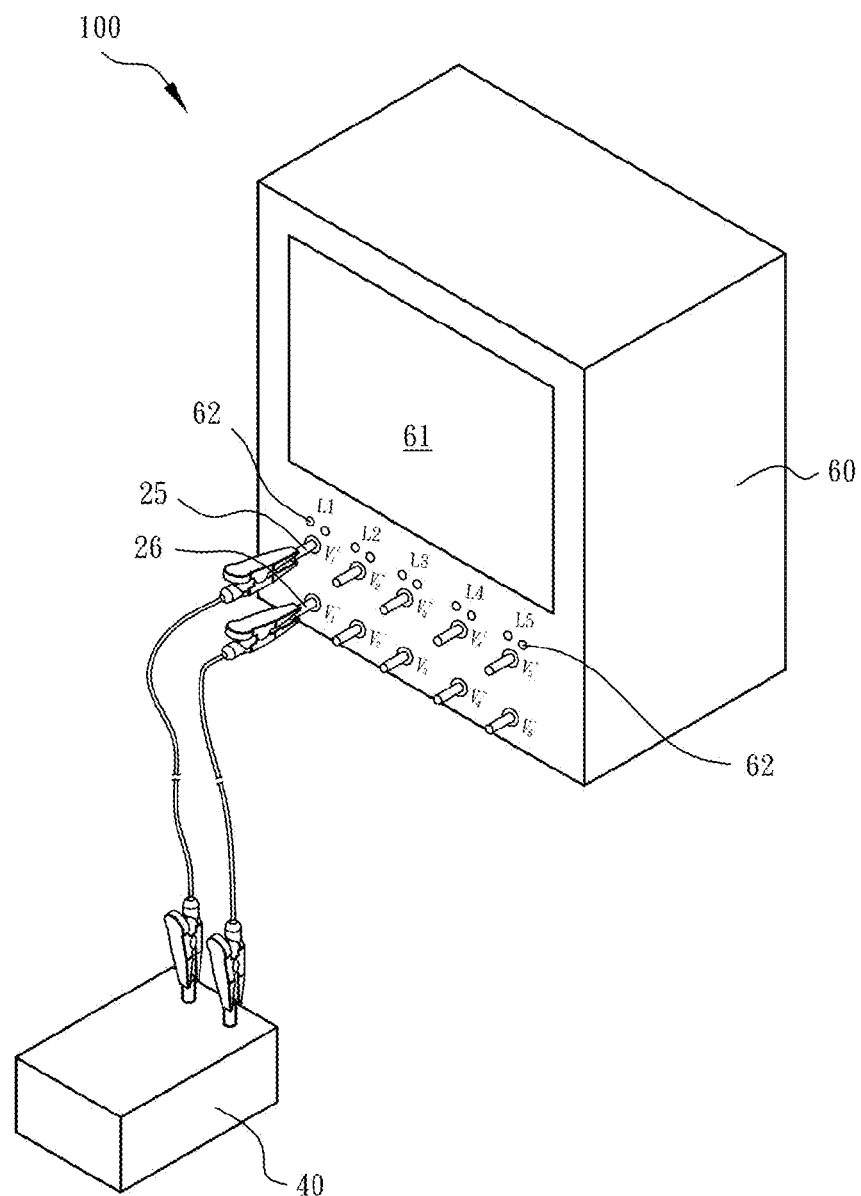
FIG. 4 is a preferred embodiment of an operational schematic diagram showing the charging process of charging the secondary battery by the charging apparatus.
Figure 5:
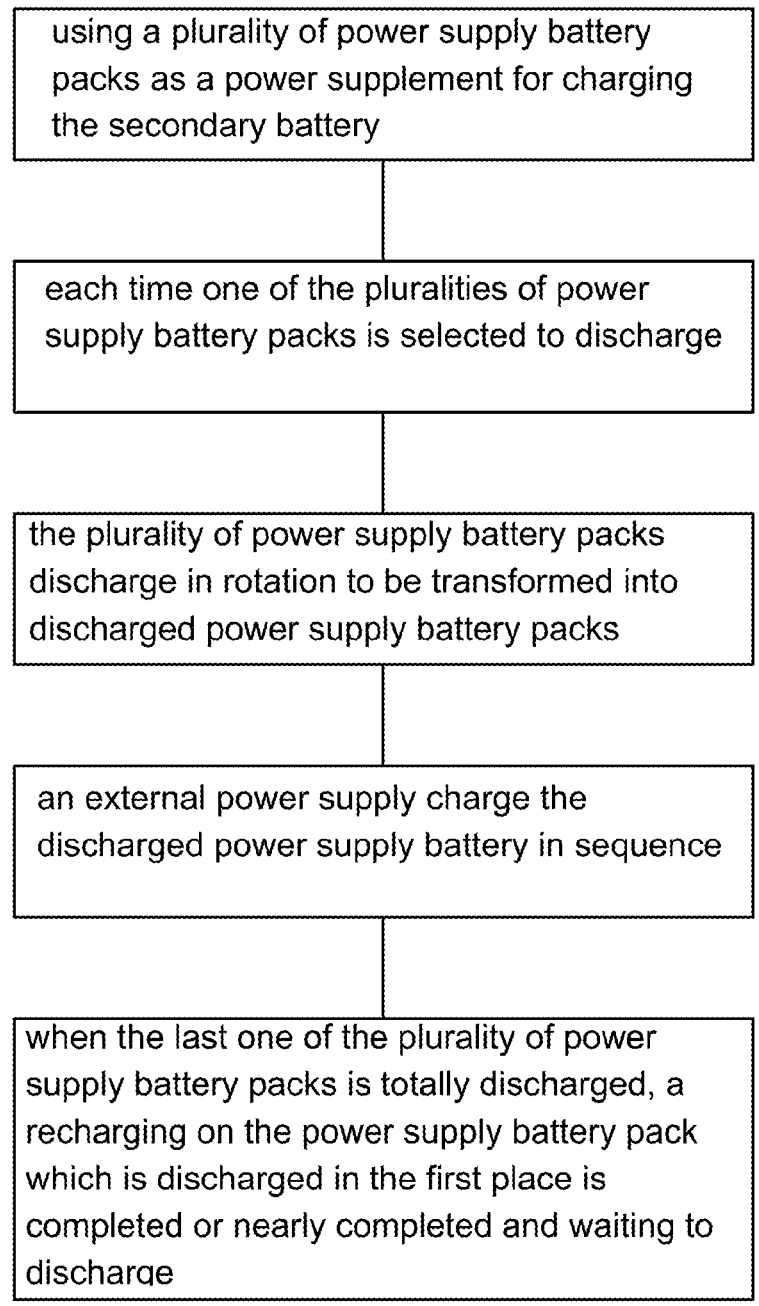
FIG. 5 is a block diagram showing how the secondary battery is charged according to the present invention.

FIG. 4 is an operational schematic diagram showing the charging process of charging the secondary battery 40 by the charging apparatus 100, and FIG. 5 is a block diagram showing how the secondary battery 40 is charged. A plurality of power supply battery packs 10 are used as the power source of the secondary battery 40, such as the five power supply battery packs 10 embodied in FIG. 1. Each time only one power supply battery pack 10 is selected to discharge, as shown in FIG. 1. First of all, connect the secondary battery 40 to the external terminals 25/26 of the first set of power supply battery pack 10, and then operate the input-output module 61 of the host computer 60 to make the first power supply battery pack 10 to charge the secondary battery 40. The plurality of power supply battery packs 10 rotationally and sequentially discharge, and the procedures are the same as mentioned above.

The External power supply 50 sequentially charges the discharged power supply battery packs 10. After being transformed by a convertor, the alternating current of the external power supply 50 will be transformed into direct current for the charge-discharge circuit 20 to charge the power supply battery packs 10. After the last power supply battery pack 10 is totally discharged, a recharging on the power supply battery pack 10 which is discharged in the first place is completed or nearly completed and waiting to discharge. As such, each of the plurality of power supply battery packs rotationally and sequentially charges the secondary battery 40. The plurality of power supply battery packs can be charged by commercial main power. Thus at least one power supply battery pack 10 is in fully charged condition and ready to discharge anytime By using the charging means and apparatus 100 for the secondary battery 40, the charging of the secondary battery 40 can be very quick. Take the 48V/22AH secondary battery 40 as example, each secondary battery 40 only needs 15 minutes to complete the charging process, which reduces plenty of time compared to the 60 minutes charging time that the traditional fast charging takes. Moreover, after fully charging a secondary battery 40, the power supply battery pack 10 can continue to charge another secondary battery 40, and thus is suitable for being used in a charging station. Therefore, electric car, electric bike, and electric motorcycle can be more easily to become popular.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A charging apparatus for a secondary battery, comprising:
    a plurality of power supply battery packs, each being defined a charging and a discharging sequence, and discharging in rotation to supply power to the secondary battery;
    a plurality of charge-discharge circuits, each corresponding to one of the plurality of power supply battery packs for charging a corresponding power supply battery pack by an external power supply, and controlling the corresponding power supply battery pack to discharge;
    a microcontroller electrically connected to each charge-discharge circuit to control charging and discharging of each power supply battery pack corresponding to each charge-discharge circuit,
    wherein the microcontroller sequentially selects one of the power supply battery packs to discharge and be recharged after the discharging; when a last power supply battery unit is recharged after discharging, the power supply battery pack which discharges firstly has been fully recharged to wait for discharging;
    wherein each of the plurality of charge-discharge circuits includes an analog detection and control circuit, a charging switch, a discharging switch, and a resistor; the analog detection and control circuit detects a power level of each of the plurality of power supply battery packs for the microcontroller, and the plurality of power supply battery packs discharge through the discharging switch and are recharged through the charging switch;
    wherein the microcontroller is connected to an input-output module of a host computer, and the analog detection and control circuit is used by the host computer to monitor conditions of the power supply battery packs; and
    a protection circuit provided between each power supply battery pack and the microcontroller, wherein the microcontroller is used to measure an amount of charging and discharging by monitoring terminals of the resistor, and also used to generate a control signal to initial an appropriate safety protection response according to a battery condition of the power supply battery pack; when the microcontroller detects abnormal or unsafe condition, an non-reusable fuse is triggered so as to stop using the power supply battery pack.

2. The charging apparatus for a secondary battery according to claim 1, wherein:
    a quantity of the plurality of power supply battery packs =(charging time of each power supply battery pack/discharging time of each power supply battery pack) +1,decimals are added or subtracted.

3. The charging apparatus for a secondary battery according to claim 1, wherein an electricity potential of the power supply battery packs are higher than that of the secondary battery.

4. The charging apparatus for a secondary battery according to claim 1, wherein the external power supply is commercial electricity power.

5. The charging apparatus for a secondary battery according to claim 1, wherein the charging switch and the discharging switch are selected from field-effect transistor, silicon controlled rectifier, and impulse circuit.

* * * * *